C. A. CLEGHORN.
RECEPTACLE, FLEXIBLE CONDUIT, GAS MASK, AND THE LIKE.
APPLICATION FILED DEC. 26, 1918.
1,422,670.
Patented July 11, 1922.
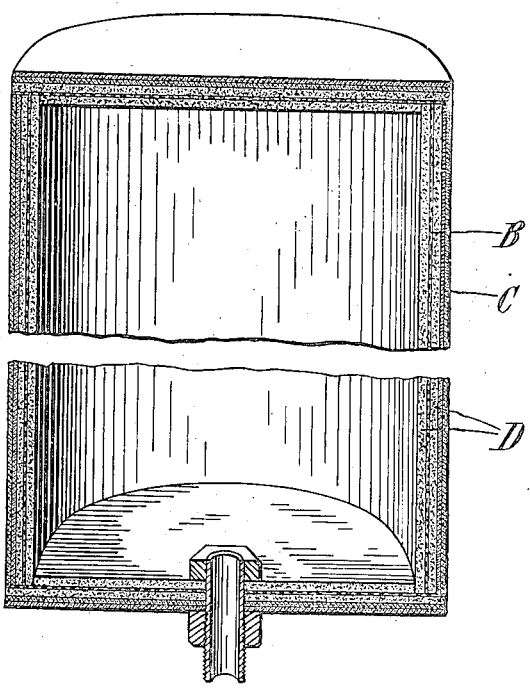
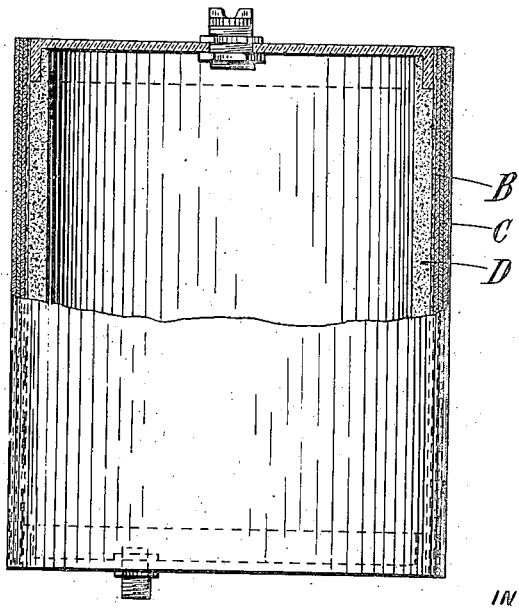
INVENTOR
Charles A. Cleghorn,
by Bakewell, Byrnes & Parmelee,
his attys.

UNITED STATES PATENT OFFICE.

CHARLES ANGUS CLEGHORN, OF BEDFORDSHIRE, ENGLAND, ASSIGNOR TO THE GAYNER PNEUMATIC COMPANY, LIMITED, OF LONDON, ENGLAND.

RECEPTACLE, FLEXIBLE CONDUIT, GAS MASK, AND THE LIKE.

1,422,670.  Specification of Letters Patent.  Patented July 11, 1922.

Application filed December 26, 1918. Serial No. 268,429.

*To all whom it may concern:*

Be it known that I, CHARLES ANGUS CLEGHORN, a subject of the King of England, residing in Bedfordshire, England, have invented certain new and useful Improvements in Receptacles, Flexible Conduits, Gas Masks, and the like, of which the following is a specification.

This invention is for improvements in or relating to receptacles, flexible conduits, gas-masks and the like, hereinafter referred to generally as "containers," for containing or keeping out fluids which otherwise would attack the substance of which the "container" is formed. Thus a rubber petrol-tank would be attacked by the petrol unless the tank were constructed according to this invention, or a rubber or canvas gas-mask would be destroyed by many of the noxious gases for which gas-masks are employed.

According to this invention, "containers" for fluids are made of substances which, as normally employed, would be attacked by the fluid are coated or permeated or both with Turkish birdlime such as is prepared from the fruits of the trees of the Cordiaceæ known botanically as "*Cordia myxa*" and "*Cordia latifolia*."

It has been previously proposed to provide pneumatic tyres with a comparatively thick layer of Turkish birdlime either on the inner surface of a single tube tyre or between two layers of fabric of which the tyre is constructed, so that when the tyre is punctured it will fill the puncture and thus prevent deflation. No claim is made for such a use of the Turkish birdlime nor indeed for any "container" whose walls as normally constructed would be unattacked by the fluid to be contained or excluded thereby, though the Turkish birdlime used according to this invention may also have the additional function of rendering the "container" self-sealing. It is believed to be new to employ the Turkish birdlime for protecting the material of the container from attack by the contents. In the tyres referred to, the Turkish birdlime was only employed for self-sealing purposes, the "container" otherwise being quite capable of retaining the air without the use of the Turkish birdlime.

A "container" constructed according to this invention, say for use as a petrol-tank, may comprise canvas and rubber. Ordinarily rubber would be attacked and gradually destroyed by the petrol, but by coating the canvas or the rubber with birdlime, the rubber is preserved from such destructive action.

Obviously rubber and canvas together may be used as the material of which the "container" is built, for example, the container may be lined with canvas and the birdlime applied to this lining to prevent the petrol from passing through the canvas and attacking the rubber. Again, rubber, or canvas and rubber, can be used for flexible conduits for conveying petrol, the interior face being always lined with birdlime.

A gas-mask may be made of any desired flexible material, which, although ordinarily attacked by the noxious gases against which it is used is protected thereagainst by coating it with birdlime, and in this case, of course, the birdlime is preferably placed between two layers of material which either do not allow it to pass through it, or if any does pass through when first manufactured, this is in such small quantities that it is easily dried.

It is not necessary to include rubber in the flexible material for the "container" as other materials which heretofore have been considered useless for this purpose in view of their liability of injury from the fluids in connection with which the "container" is used, can be employed.

In some cases the walls of the "container" for a liquid such as petrol, may be made double with a layer of birdlime between them. This will render the walls self-sealing as well as render them immune from attack; if the inside wall is of rubber, this of course would be coated also on the inside with birdlime to protect it. Such a "container" would be useful as a petrol-tank for aeroplanes, or engines exposed to bullets or shell-fragments.

Two forms of "container" according to the present invention are illustrated in cross-section in the accompanying drawing. In Figure 1 the "container" comprises a canvas layer B coated on the inner side with a coating of birdlime D, and is surrounded by layers of rubber C. Thus any fluid in the container liable to have a deleterious action on the rubber, as say petrol is prevented from such action by the coating of birdlime. In Figure 2 between the layers B and C is layer of birdlime D with layer of birdlime D also on the inner side of layer B.

What I claim as my invention and desire to secure by Letters Patent is:—

1. A petrol-container made of a substance which as normally employed would be attacked by the petrol but which is coated with Turkish birdlime, to prevent such attack, substantially as described.

2. A petrol-container of the type described, having double walls of canvas and rubber with a layer of Turkish birdlime between them, for the double purpose of preventing escape of petrol through the substance whereof the walls are composed and to render the container self-sealing, substantially as described.

3. A flexible petrol "container" comprising a sheet of rubber internally coated with Turkish birdlime, for the purpose described.

4. A flexible petrol "container" comprising separate sheets of rubber and canvas with an internal coating on the interior of said sheets of Turkish birdlime, for the purpose described.

5. A petrol "container" having double walls one of canvas and the other of rubber with a layer of Turkish birdlime between them and a coating of Turkish birdlime on the inner wall for the double purpose of preventing the escape of petrol through the substance whereof the walls are composed and to render the "container" self-sealing.

6. A petrol "container" constructed with double walls including rubber with a layer of Turkish birdlime between said walls and a coating of Turkish birdlime on the inside of the inner wall for the double purpose of preventing the escape of petrol through the substance whereof the walls are composed and to render the "container" self-sealing.

7. A "container" for deleterious fluids of the type to which Turkish birdlime is resistant comprising a substance which as normally employed would be attacked by the fluids but which is coated with Turkish birdlime to prevent such attack.

8. A flexible "container" for deleterious fluids of the type to which Turkish birdlime is resistant, comprising a sheet of rubber internally coated with Turkish birdlime, for the purpose described.

9. A "container" for deleterious fluids of the type to which Turkish birdlime is resistant comprising a sheet of rubber which as normally employed would be attacked by the fluid but which is internally coated with Turkish birdlime to prevent such attack.

10. A "container" for deleterious fluids of the type to which Turkish birdlime is resistant comprising a sheet of rubber which as normally employed would be attacked by the fluid but which is coated with Turkish birdlime on its surface which is to face the fluid, to prevent such attack.

11. A flexible "container" for deleterious fluids of the type to which Turkish birdlime is resistant, comprising sheets of rubber and canvas internally coated with Turkish birdlime, for the purpose described.

12. A "container" for deleterious fluids of the type to which Turkish birdlime is resistant constructed with double walls including rubber with a layer of Turkish birdlime between them and a coating of Turkish birdlime on the inner wall for the double purpose of preventing the passage of fluid through the substance whereof the walls are composed and to render the "container" self-sealing.

13. A "container" for deleterious fluids of the type to which Turkish birdlime is resistant having double walls including canvas and rubber with a layer of Turkish birdlime between them for the double purpose of preventing the passage of fluid through the substance whereof the walls are composed and to render the "container" self-sealing.

14. A "container" for deleterious fluids of the type to which Turkish birdlime is resistant having double walls comprising canvas and rubber with a layer of Turkish birdlime between them and a coating of Turkish birdlime on the inner wall for the double purpose of preventing the passage of fluid through the substance whereof the walls are composed and to render the "container" self-sealing.

15. A "container" for deleterious fluids having an inner layer of Turkish birdlime outside which are double walls comprising canvas and rubber with a layer of Turkish birdlime between them for the double purpose of preventing the passage of fluid through the substance whereof the shell of the "container" is composed and to render the "container" self-sealing.

16. A petrol "container" having an inner lining surrounded by a layer of Turkish birdlime outside which are double walls comprising canvas and rubber with a layer of Turkish birdlime between them for the double purpose of preventing escape of petrol through the substance whereof the shell of the "container" is composed and to render the "container" self-sealing.

17. A "container" for deleterious fluids of the type to which Turkish birdlime is resistant comprising a substance which as normally employed would be attacked by the fluids but which is coated with Turkish birdlime to prevent such attack, said substance being arranged in a plurality of layers.

18. A petrol "container" comprising a substance which as normally employed would be attacked by the petrol but which is coated with Turkish birdlime to prevent such attack, said substance being arranged in a plurality of layers.

19. A petrol "container" comprising a plurality of sheets of rubber which as normally employed would be attacked by the petrol but which are internally coated with Turkish birdlime where exposed to the petrol to prevent such attack.

In testimony whereof I affix my signature.

CHARLES ANGUS CLEGHORN.